United States Patent
Kita et al.

(10) Patent No.: US 6,683,269 B2
(45) Date of Patent: Jan. 27, 2004

(54) WORKING FLUID PROCESSING DEVICE OF WIRE ELECTRIC DISCHARGE MACHINE

(75) Inventors: Yuki Kita, Yamanashi (JP); Hiroyuki Abe, Yamanashi (JP); Shinji Okuda, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 10/098,491

(22) Filed: Mar. 18, 2002

(65) Prior Publication Data

US 2002/0134759 A1 Sep. 26, 2002

(30) Foreign Application Priority Data

Mar. 22, 2001 (JP) .......................... 2001/83119

(51) Int. Cl.[7] .............. B23H 1/08; B23H 1/10
(52) U.S. Cl. .............. 219/69.14; 219/69.11
(58) Field of Search .............. 219/69.14, 69.11, 219/69.17

(56) References Cited

U.S. PATENT DOCUMENTS 5,081,332 A * 1/1992 Sakuragawa .............. 219/69.13
5,386,094 A * 1/1995 Kawai et al. .............. 219/69.14
5,434,381 A * 7/1995 Mitcheson .............. 219/69.14

FOREIGN PATENT DOCUMENTS

| EP | 417289 | * 3/1991 | .......... B23H/7/14 |
| JP | 5-2842 | 1/1993 | |
| JP | 7-31819 | 2/1995 | |
| JP | 11-37917 | 2/1999 | |

OTHER PUBLICATIONS

Patent Abstracts of Japan, Publication No. 11–037917, dated Feb. 12, 1999.
Patent Abstracts of Japan, Publication No. 7–031819, dated Feb. 3, 1995.
Japanese Patent Office Action mailed Jun. 3, 2003 and English Translation.

* cited by examiner

*Primary Examiner*—M. Alexandra Elve
(74) *Attorney, Agent, or Firm*—Staas & Halsey LLP

(57) ABSTRACT

For maintenance and management of filters in a wire electric discharge machine, a sensor for detecting the filtration pressure is disposed between the filter and pump in the working fluid circulation channel. The sensor periodically senses the pressure and its output (transition of water pressure) is stored and sequentially displayed as a graph on a display device to allow monitoring of filter clogging by checking such sensor output at the time of commencing the processing.

13 Claims, 5 Drawing Sheets

GRAPH 1

GRAPH 2

GRAPH 3

WORKING FLUID PROCESSING DEVICE OF WIRE ELECTRIC DISCHARGE MACHINE

BACKGROUND OF THE INVENTION

1. Field of the Invention

The present invention relates to a working fluid processing device in a wire electric discharge machine, and particularly to technology for safely and easily performing the maintenance and management of filters in such a working fluid processing device.

2. Description of the Related Art

Upon performing electric discharge machining with a wire electric discharge machine, a working fluid (usually water) is used for maintaining the insulation between an electrode and a work piece, and eliminating chips generated pursuant to machining. The working fluid (impure water) containing chips or sludge such as dust that crept in is guided to a filter via a holding tank, and sludge is thereby filtered and eliminated. The working fluid cleaned with the filter is re-supplied to the processing unit via a fresh-water tank for storing the clean working fluid.

A filter becomes gradually clogged pursuant to the prolonged use thereof, and the pressure applied to the filter increases in accordance with the clogging. A dangerous state is generated when the increase in pressure exceeds the limit, and, as a result, it is not unusual for accidents to occur which are caused by the breakage or falling-off of filters and hoses.

In order to prevent such incidents, conventionally, as shown in FIG. 1, a water pressure gauge for measuring filtration pressure was disposed in the flow path between a filter pump, which aspirates impure water from a holding tank storing such impure water generated at the processing unit and supplies the filter with this impure water, and the filter, and an operator visually confirmed the pressure indication of such water pressure gauge.

In other words, the operator visually read the filtration pressure at the time of commencing the processing or the like, and changed the filter if the filtration pressure has reached a replacement pressure (a reference pressure value set for determining the necessary point of time for replacing the filter). Moreover, as a substitute of this type of water pressure gauge checking, there is a method of employing an accumulated operating time of a filter as an object to be checked, and replacing the filter if the operating time has reached the replacement time (reference time established for determining a necessary point of time for replacing the filter).

However, in general, a filtration pressure appearing between a filter and a filter pump during a continuous machining or immediately after the completion of machining differs from the filtration pressure at a time a suspension time has elapsed after the stoppage of the continuous machining, even if the degree of progress in filter clogging is the same. This is because the sludge attached to the filter element inside the filter is detached upon the depressurization caused by the suspension of the pump, or the attachment of such sludge is temporarily loose.

Naturally, a high filtration pressure will not be displayed easily even if the operator visually checks a water pressure gauge in such a situation. Thus, when the operator restarts machining without anxiety, the filter element is pressurized, and gradually returns to the original filter pressure. And, when the machining is further continued, there is a possibility that the pressure applied to the filter may increase to a dangerous level. During such time, if the operator fails to confirm the pressure due to reasons of nighttime operation or the like, rupture accidents and so on may actually occur.

As described above, even if an operator visually confirms the pressure value shown on a water pressure gauge, such value will vary largely depending on the timing of such visual confirmation, so that there is a possibility that the value will not accurately reflect the progress of filter clogging. Therefore, filter replacement time cannot be reliably determined.

Further, since the progress of filter clogging will vary depending on conditions such as the amount of chips generated per unit machining time, it is not possible to adequately determine filter replacement time relying upon the checking of an operating time (accumulated machining time).

SUMMARY OF THE INVENTION

An object of the present invention is to improve a working fluid processing device of a wire electric discharge machine which can provide an operator with information necessary for determining filter replacement time.

The present invention achieves the foregoing object by disposing a pressure detection sensor between a filter pump and a filter in a working fluid processing device of a wire electric discharge machine, and, by processing the water pressure information with a controller, providing an operator with useful information for determining filter replacement time.

In other words, the present invention is applied to a working fluid processing device of a wire electric discharge machine which supplies an electric discharge processing unit with working fluid stored in a fresh-water tank via a supply channel on the one hand, and temporarily stores the working fluid used in the electric discharge processing unit in a holding tank on the other hand, and enables the working fluid to return to the fresh-water tank via a pump and a filter, and improves this device as described in the following embodiments.

With the first embodiment of the present invention, a sensor for detecting a filtration pressure of the filter is provided, and the water pressure transition is recorded based on the output of the sensor. As a result, an operator can know the filtration pressure of a filter from the present time (time of confirming the recorded contents) by tracing an elapsed time. Therefore, unlike conventional technology where only an instantaneous value at the time of visually checking a water pressure gauge can be confirmed, the progress of filter clogging can be acknowledged with ease.

With the second embodiment of the present invention, a sensor for detecting the filtration pressure of the filter and display means for displaying the filtration pressure of the filter are provided, and the water pressure transition is displayed on the display means based on the output of the sensor. For example, a point of X-Y relationship, with the X-axis being the time and the Y-axis being the filter pressure, is plotted on a monitor screen in a graph format. The operator is thereby able to know the filtration pressure of the filter, at a glance, from the present time (time of confirming the recorded contents) by tracing an elapsed time.

In the foregoing second embodiment, storage means for storing, at prescribed time intervals, filtration pressure detected by a sensor may be provided so as to display the stored filtration pressure. Moreover, displaying of the filtration pressure detected by the sensor on the display means may be renewed only at the time of processing.

Further, information function of anomalies may be added to each of the foregoing embodiments. For instance, information on an anomaly may be made when the sensor detects a filtration pressure exceeding a predetermined reference. In addition, information on an anomaly may be made when the sensor detects, during operation after the commencement of operation, a filtration pressure falling below the filtration pressure detected at the time of the previous filtration pressure detection.

DESCRIPTION OF THE PREFERRED EMBODIMENTS

Figure 1:
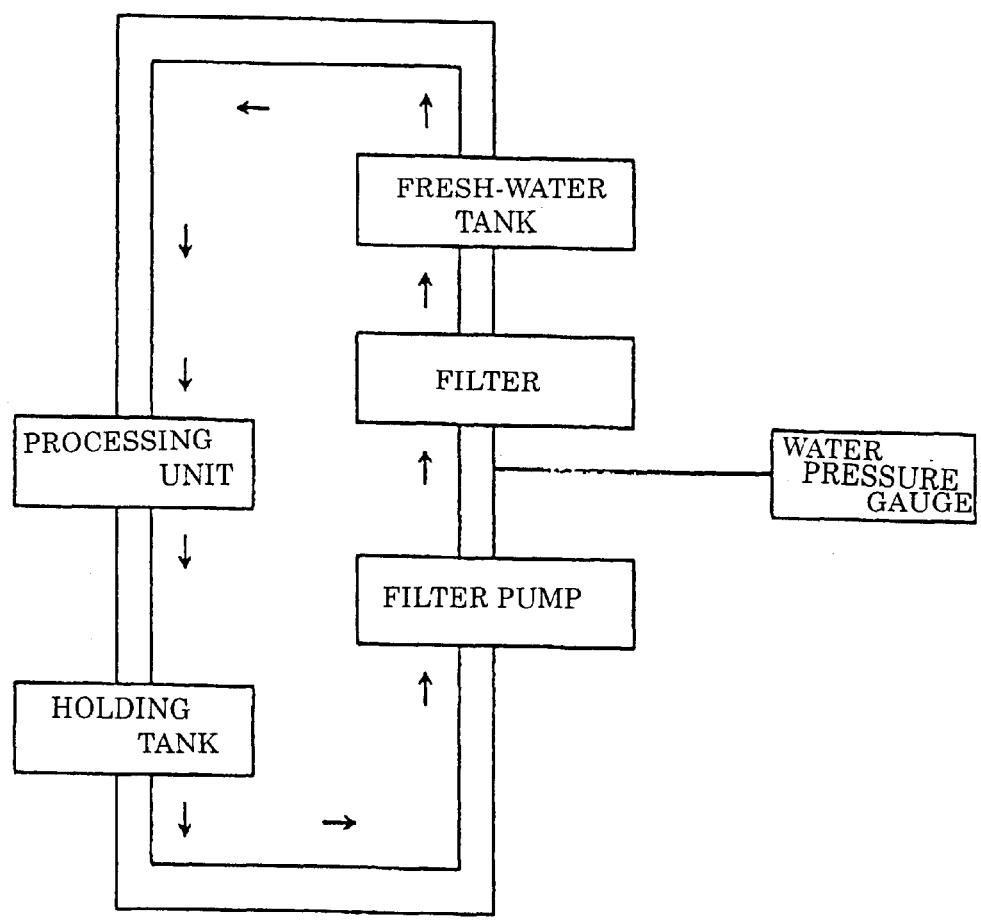
FIG. 1 is a diagram explaining a conventional technology.
Figure 2:
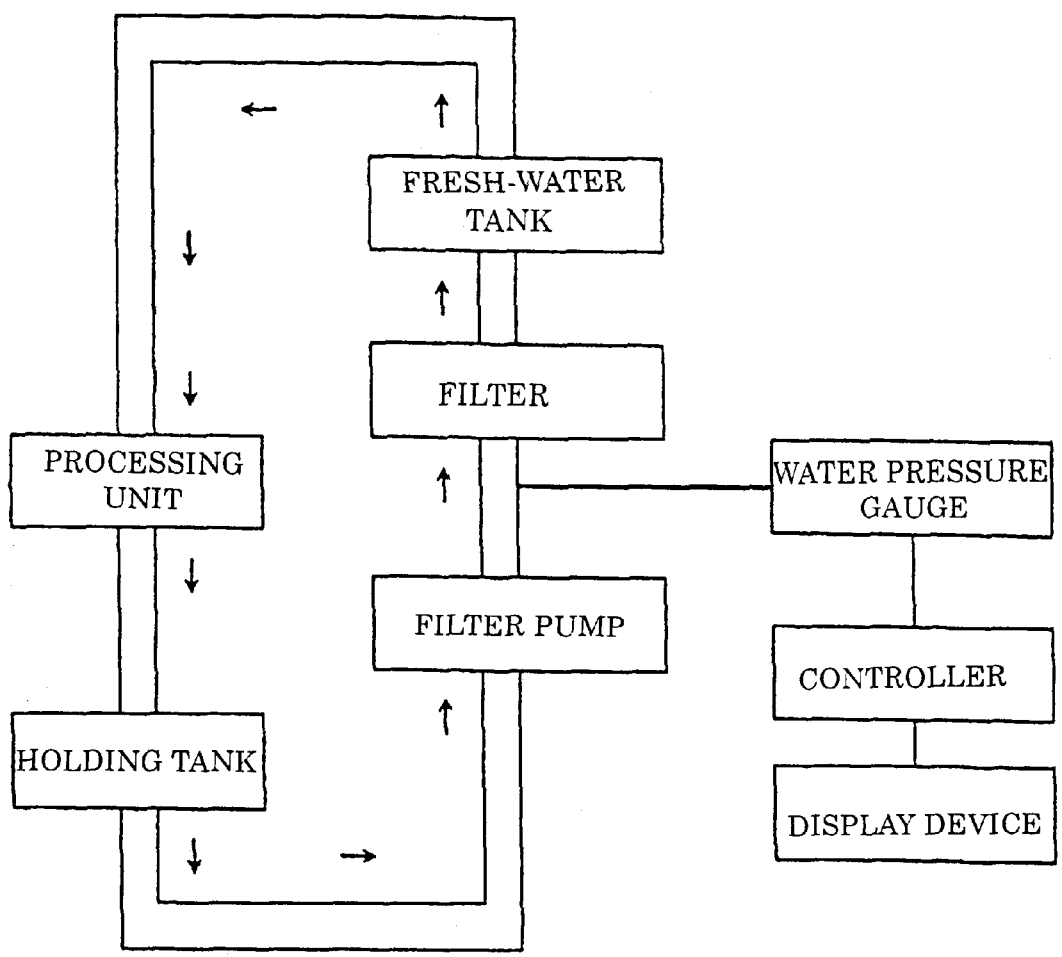
FIG. 2 is a diagram showing the outline of the overall structure of an embodiment according to the present invention.

FIG. 2 shows the outline of the overall structure of an embodiment according to the present invention. Upon referring to FIG. 2, disposed along the working fluid circulation channel in a working fluid processing device are a processing unit for performing wire electric discharge machining in the working fluid, a holding tank for temporarily storing the working fluid (impure water) containing processing waste generated therein or sludge such as dust that crept in, a pump (sometimes referred to as a filter pump; hereinafter the same) for aspirating the impure water from the holding tank and supplying such impure water to the filter, a filter for receiving the working fluid supplied from the pump, and a fresh-water tank for temporarily storing the working fluid cleaned with the filter, and the working fluid circulates in the direction represented with the arrows.

And, a sensor for detecting a filtration pressure, that is, water pressure applied to a filter, is disposed at the upstream of the filter (between the filter and pump). This sensor outputs detected water pressure as an analog voltage or an analog current signal, and this type of water pressure sensor is commercially available, and may be obtained at a relatively low cost.

The output of this sensor is sent to the controller and AD converted, and the detected transition of the filtration pressure of the filter is recorded by the sensor. Moreover, data representing the transition of a filtration pressure is stored in the controller and displayed in the form of graph on a display device (CRT, liquid crystal display device, printer, etc.)

Figure 3:
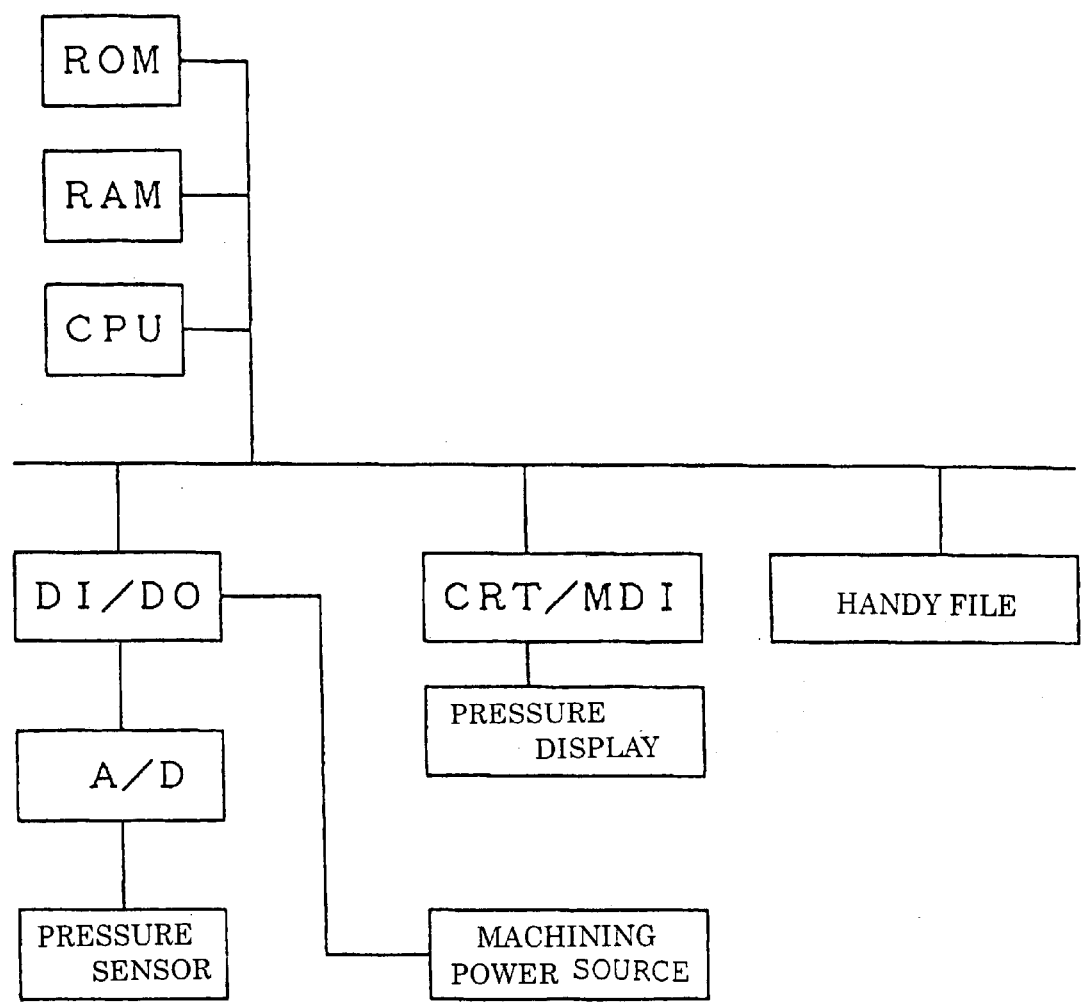
FIG. 3 is a block diagram showing the principle portions of the embodiment illustrated in FIG. 2.

The principal portions of the controller and display device are displayed in FIG. 3 in the form of block diagram. To the controller shown in FIG. 3 which has a so-called NC function, a CPU, a ROM, a RAM, a DI/DO (digital signal input/output device), a control circuit, a CRT/MDI and a handy file are connected via a bus line.

The CPU fulfills processor function for numerical control as well as processor function for various applications including processing relating to storage, displaying, monitoring and so on of a filtration pressure, which are described later.

The ROM stores a basic program for controlling the overall system, a system program for the numerical control function, and a program for processing relating to the storage, displaying, monitoring and so on of the filtration pressure.

Moreover, the RAM is used as a memory for temporarily storing data operated by the CPU, and for storing a processing program for a work piece read from the handy file and so on.

The DI/DO is a digital input/output device connected to various actuators and various sensors of a working fluid flow controlling device, an electric discharge machining power source and so on. The sensor employed in the present embodiment is connected to the DI/DO via the AD converter.

The control circuit is connected to the respective servomotors of the X, Y and Z axes and U and V axes for causing the wire electrode to move relative to the work piece in order to perform machining. When machining is started, the CPU activates the electric discharge machining power source under the established electric discharge machining conditions, drives the servomotors of the respective X, Y, Z, U, V axes via the control circuit in accordance with the processing program stored in the RAM, and performs electric discharge machining while moving the wire electrode relative to the work piece.

The recording and display of the filtration pressure are conducted as follows.

The water pressure sensor disposed between the filter pump and the filter outputs a signal roughly proportionate to the water pressure in an analog voltage or an analog current. This signal is converted into a digital signal with the AD converter of the controller. This data transmission and AD conversion are constantly performed.

The CPU of the controller incorporates this AD-converted data via the DI/DO (digital signal input/output device) at a fixed sampling period T, and sequentially stores this in the RAM. The stored data is read immediately thereafter, and the filter pressure Y for each sampling period T is plotted with respect to the time coordinate axis X on the monitor screen (CRT screen) in a graph format. In addition, the stored contents maybe stored in the RAM or another memory and, instead of the automatic plotting, the operator may read and confirm the data upon manually operating the controller.

Figure 4:
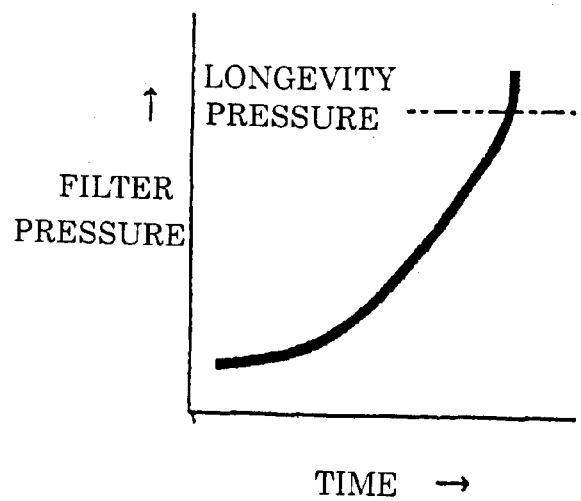
FIG. 4 is a graph showing an example of the pressure transition in the embodiment illustrated in FIG. 2.

Meanwhile, when automatic plotting is started at the starting time of an initial machining subsequent to loading of a new filter, the filter pressure will show a transition of gradual increase as illustrated in Graph 1 of FIG. 4 if machining is continued, and will eventually reach the pressure (longevity pressure) indicating longevity, unless a problem such as a rupture occurs. Further, in Graph 1, the latest plotting point shows that the filtration pressure has exceeded the longevity pressure, but has not resulted in a rupture yet. As this state is already in a warning zone, it is desirable that the filter be replaced immediately. This phenomenon may appear in the case of a long-term continuous operation.

Next, when a continuous processing is ended or discontinued without lasting too long, or when a power is turned off, the filter pressure decreases temporarily. And, when the machining is restarted, the filter pressure begins to increase once again. An example of this type of transition is shown in Graph 2 of FIG. 5.

What is important here is that an operator can confirm the filter pressure when the filter pressure at the time of restarting of machining has once decreased, in a wire cutting machine that often employs unattended processing, but this confirmation can not be a cause of a false recognition of the progress of filter clogging. In other words, since the gap (from symbol A to symbol B) in the middle of the transition as shown in Graph 2 can be known at a glance upon confirming the graph display, the progress of filter clogging can be accurately known from the position of symbol B (by referring to longevity pressure). With a conventional technology, only the state represented with symbol B could be known, so that false recognitions of the progress of filter clogging may occur easily.

Figure 5:
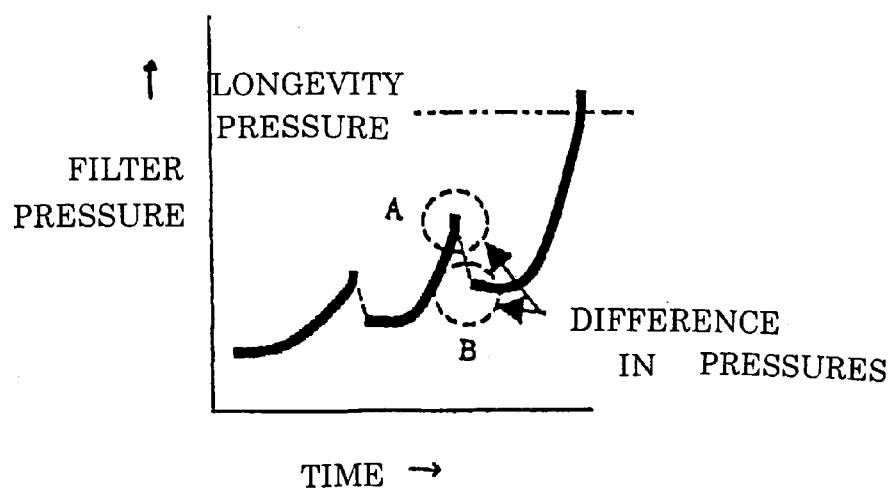
FIG. 5 is a graph showing another example of the pressure transition in the embodiment illustrated in FIG. 2.

Moreover, in Graph 2 of FIG. 5, no plotting is made between symbol A and symbol B because an automatic plotting has been paused from a time corresponding to symbol A to a time corresponding to symbol B. This shows an automatic plotting (displaying, in general) of a filtration pressure to be detected by the sensor is renewed only during machining, in the case of the present embodiment. If an automatic plotting is also continued during the suspension of machining, symbols A and B will be connected with a downward line.

As described above, in the present embodiment, since the filtration pressure transition detected by the sensor is comprehended in prescribed periods by means of the controller, a simple alarm system can also be provided in the present embodiment.

As a simplest example of such an alarm system, a CPU may determine on a case-by-case basis regarding whether the latest detection output incorporated exceeds the predetermined longevity pressure (stored in the RAM), and output an alarm if the determination of the CPU result in YES.

Figure 6:
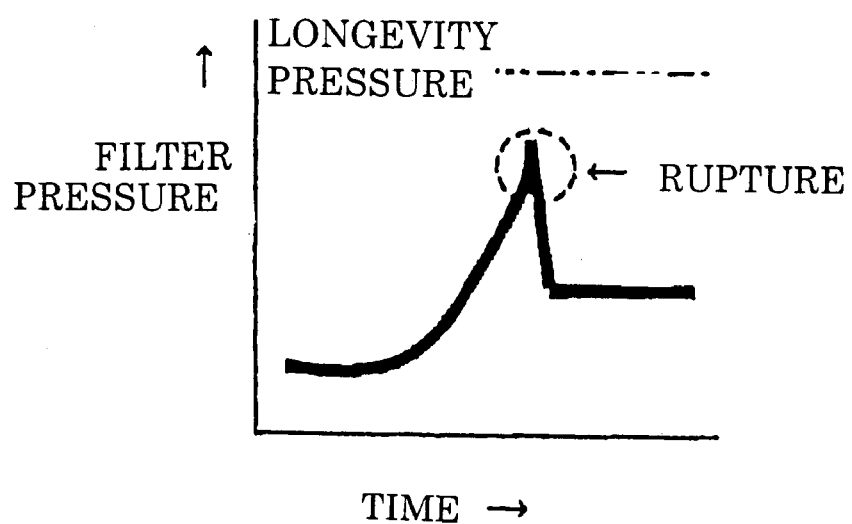
FIG. 6 is a graph showing still another example of the pressure transition in the embodiment illustrated in FIG. 2.

Moreover, as another example of an alarm system, an alarm may be outputted when the sensor detects, during operation after the commencement of operation, a filtration pressure falling below the filtration pressure detected at the time of previous filtration pressure detection. This case, for example, is when a rupture accident occurs due to some reason (insufficient durability performance of the filter, for instance) and the water pressure rapidly decreases as shown in Graph 3 of FIG. 6. Moreover, here, this judgment is made "during operation subsequent to the start of operation" in order to prevent the alarm from being outputted in correspondence with symbol B in Graph 2. In other words, an alarm is not outputted by comparing the value of the first plot subsequent to the restart of machining corresponding to symbol B with the value of the previous plot (corresponding to symbol A) prior to such restart.

When an alarm is outputted, the controller informs of an anomaly by means of displaying on the CRT screen, sound, or illumination of a red lamp in accordance with a prescribed program. With this information, an operator can immediately know the occurrence of an anomaly. The power source may also be turned off pursuant to such alarm output.

According to the present invention, the reliability of maintenance of filters for sludge filtration used by a working fluid processing device in a wire cut electric discharge machine can be improved, and safety can be secured easily as a result thereof. Since the change in filter pressure is recorded or displayed on a monitor, it is possible to easily confirm whether the pressure comes close to the replacement pressure even in a case where the pressure has once decreased during suspension of machining. It is therefore possible to prevent ruptures even during a nighttime operation or unattended operation thereafter.

Moreover, with a simple danger determination function provided, it becomes possible to easily inform of anomalies when the filtration pressure of a filter exceeds a reference value, or when a filtration pressure, which falls below the filtration pressure detected at the time of the previous filtration pressure detection, is detected during the restart of the operation subsequent to suspension of machining. Accordingly, the burden on an operator regarding the maintenance of filters can be alleviated.

What is claimed is:

1. A working fluid processing device of a wire electric discharge machine which supplies an electric discharge processing unit with working fluid stored in a fresh-water tank via a supply channel, and which temporarily stores working fluid used in said electric discharge processing unit in a holding tank, thereby causing said working fluid to return to the fresh-water tank via a pump and a filter, comprising:

a sensor for periodically detecting a filtration pressure of said filter;

a storage device for storing the filtration pressures detected periodically by said sensor; and a device for indicating a filtration pressure transition based on said stored filtration pressures.

2. A working fluid processing device of a wire electric discharge machine which supplies an electric discharge processing unit with working fluid stored in a fresh-water tank via a supply channel, and which temporarily stores working fluid used in said electric discharge processing unit in a holding tank, thereby causing said working fluid to return to the fresh-water tank via a pump and a filter, comprising:

a sensor for periodically detecting a filtration pressure of said filer;

a storage device for storing the filtration pressures detected periodically by said sensor; and a display for displaying a filtration pressure transition of said filter based on said stored filtration pressures.

3. The working fluid processing device of a wire electric discharge machine according to claim 2, wherein the display is renewed only during operation of the processing device.

4. The working fluid processing device of a wire electric discharge machine according to claim 1, wherein an anomaly is indicated via the indicating device, when said sensor detects a filtration pressure exceeding a predetermined reference value.

5. The working fluid processing device of a wire electric discharge machine according to claim 1, wherein an anomaly is indicated via the indicating device, when said sensor detects, after commencement of operation of the processing device, a filtration pressure falling below the filtration pressure detected at the time of a previous filtration pressure detection.

6. The working fluid processing device of a wire electric discharge machine according to claim 2, wherein an anomaly is displayed when said sensor detects a filtration pressure exceeding a predetermined reference value.

7. The working fluid processing device of a wire electric discharge machine according to claim 2, wherein an anomaly is displayed when said sensor detects, after commencement of operation of the processing device, a filtration pressure falling below the filtration pressure detected at the time of a previous filtration pressure detection.

8. The working fluid processing device according to claim 1, wherein the indicating device is an alarm.

9. The working fluid processing device according to claim 8, wherein the alarm is activated when a filtration pressure exceeds a predetermined longevity pressure.

10. The working fluid processing device according to claim 8, wherein the alarm is activated when a filtration pressure is less than a predetermined filtration pressure.

11. The working fluid processing device according to claim 8, wherein the claim is audible.

12. The working fluid processing device according to claim 8, wherein the alarm is visible.

13. The working fluid processing device according to claim 2, wherein the display displays the transition as a graph of filter pressure versus time, and compares same to a predetermined longevity pressure which is the pressure at which the filter is preferably replaced.

* * * * *